United States Patent [19]

Akamine et al.

[11] Patent Number: 4,943,719

[45] Date of Patent: Jul. 24, 1990

[54] MICROMINIATURE CANTILEVER STYLUS

[75] Inventors: Shinya Akamine; Thomas R. Albrecht, both of Stanford; Thomas E. Carver, Mountain View, all of Calif.

[73] Assignee: The Board of Trustees of the Leland Stanford University, Stanford, Calif.

[21] Appl. No.: 297,770

[22] Filed: Jan. 17, 1989

[51] Int. Cl.$^5$ .................. G01B 5/28; G01C 7/00; H01J 37/26; H01L 21/306

[52] U.S. Cl. .................... 250/306; 33/556; 33/558; 33/561; 156/647; 73/105

[58] Field of Search ............... 250/306; 33/556, 558, 33/561, 551, 554; 156/647; 73/105

[56] References Cited

U.S. PATENT DOCUMENTS

| | | | |
|---|---|---|---|
| 3,977,925 | 8/1976 | Schwabe | 156/647 |
| 4,312,117 | 1/1982 | Robillard et al. | 156/647 |
| 4,668,865 | 5/1987 | Gimzewski et al. | 250/306 |
| 4,806,755 | 2/1989 | Duerig et al. | 250/306 |

OTHER PUBLICATIONS

Petersen, IEEE Transactions on Electron Devices, vol. ED-25, No. 10, Oct. 1978, pp. 1241-1250.
Angell et al., Scientific American, vol. 248, No. 4, pp. 36-47 (Apr. 1983).

*Primary Examiner*—Jack I. Berman
*Attorney, Agent, or Firm*—Flehr, Hohbach, Test, Albritton & Herbert

[57] ABSTRACT

Integral sharp tips on thin film cantilevers are produced by forming a rectangular silicon post on a (100) silicon wafer. Etching the top of the post leaves sharp silicon tips at the corners of what remains of the silicon post. A silicon dioxide cantilever with an integral tip is thermally grown over the silicon wafer and the sharp silicon tips.

19 Claims, 7 Drawing Sheets

MICROMINIATURE CANTILEVER STYLUS

BACKGROUND OF THE INVENTION

1. Field of the Invention. This invention relates to apparatus and methods of forming thin film microcantilevers for use in atomic force microscopes and other microscope systems.

2. Prior Art. An atomic force microscope (AFM) scans over the surface of a sample in two different modes of operation. In one mode, the contacting mode, a sharp tip is mounted on the end of a cantilever and the tip rides on the surface of a sample with an extremely light tracking force, on the order of $10^{-5}$ to $10^{-10}$ N. In the contacting mode of operation, profiles of the surface topology are obtained with extremely high resolution. Images showing the position of individual atoms are routinely obtained. In the other mode, the tip is held a short distance, on the order of 5 to 500 Angstroms, from the surface of a sample and is deflected by various forces between the sample and the tip, such forces include electrostatic, magnetic, and van der Waals forces.

Several methods of detecting the deflection of the cantilever are available which have subangstrom sensitivity, including vacuum tunneling, optical interferometry, optical beam deflection, and capacitive techniques. However, fabrication of a readily reproducible cantilever stylus assembly has been a limiting factor on use of AFM and other forms of microscopy such as scanning tunneling microscopes.

The technical requirement for a cantilever stylus assembly, which includes a cantilever arm and a protruding tip, include a number of different factors. A low force constant for the cantilever is desirable so that reasonable values of deflection are obtained with relatively small deflection forces. Typical values are 0.01–1000 N/m. A mechanical resonant frequency for the cantilever which is greater than 10 kHz ia desirable to increase image tracking speed and to reduce sensitivity to ambient vibrations. Low force constants and high resonant frequencies are obtained by minimizing the mass of the cantilever.

When optical beam deflection is used to detect deflection of the cantilever, deflection sensitivity is inversely proportional to the length of the cantilever. Therefore a cantilever length of less than 1 mm is desirable.

For certain types of deflection sensing, a high mechanical Q is desirable and is achieved by using amorphous or single crystal thin films for fabrication of the cantilever.

In many applications, it is desirable that the cantilever flex in only one direction and have high lateral stiffness. This can be obtained by using a geometry such as V-shape which has two arms obliquely extending and meeting at a point at which the tip is mounted.

It is often required that a conductive electrode or reflective spot be located on the side of the cantilever opposite the tip. This is obtained by fabricating the cantilever from metal or depositing a conductive material on certain portions of the cantilever to serve as a conductor or reflector.

Finally, a sharp tip, that is, a protruding tip with a tip radius less than 500 Angstroms and which may terminate in a single atom, is desired to provide good lateral resolution. This requirement has traditionally been one of the post difficult to obtain in a reproducible manner. Typically, in the prior art, tips were made by hand using fabrication and bonding techniques which were time consuming and which produced non-uniformly performing tips.

In the prior art, cantilever arms were constructed by hand from fine tungsten wires. One way of obtaining a tip portion on such an arm was to etch the wire to a point and then bend the point to perpendicularly extend from the wire. Another way to obtain a tip was to glue a tiny diamond fragment in place at the end of a cantilever. Prior art cantilevers fabricated using photolithographic techniques did not have integrally-formed sharp protruding tips. For these cantilevers a rather dull tip was effectively obtained by using a corner of the microfabricated cantilever itself as a tip. Alternatively, a diamond fragment was glued by hand to the end of a microfabricated cantilever. The cantilever assembly of an AFM is relatively fragile and is virtually impossible to clean when it is contaminated by material from the surface being scanned so that frequent replacement is required.

Anisotropic etching of (100) silicon wafers to form pyramidal-shaped or knife-edged pits is discussed in an article by K. E. Petersen entitled "Silicon as a Mechanical Material," Proceedings of the IEEE, Vol. 79, No. 5, pgs. 423-430, May 1983. This article also discusses a very great decrease for anisotropic etching of silicon which is doped with boron. In effect, doping silicon with boron prevents etching. This article also refers to an article by D. A. Kiewit entitled "Microtool fabrication by etch pit replication," Rev. Sci. Instrum., vol. 44, p. 1741, 1973, which discloses using thermally grown silicon dioxide as a mask for selective etching of pits in a (100) wafer and which discloses filling those pits with electrolessly deposited nickel-phosphorous.

Currently, technologists are attempting to microfabricate STMs and AFMs using the microfabrication techniques which are compatible with standard fabrication processes used in the silicon semiconductor integrated circuit industry. Their goal is to mass-produce very precise, very reliable sensors which have minimal thermal drift, signal loss, and low noise characteristics by taking advantage of the inherent low mass, high resonant frequencies, and low thermal drift characteristics of microfabricated devices. In addition, these microfabricated sensors can be integrally combined with electronic circuitry fabricated with the same processes.

SUMMARY OF THE INVENTION

It is therefore an object of the invention to provide a cantilever assembly for an AFM which is fabricated using semiconductor integrated circuit fabrication techniques.

In accordance with this and other objects of the invention, a process for producing an integrally formed sharp tip is provided. A rectangular silicon post is formed on the surface of a (100) silicon wafer. The post is surrounded with oxide and its top is anisotropically etched down to leave triangular-shaped silicon formations at the remaining corners of the post. The wafer and silicon formations are thermally oxidized to produce a $SiO_2$ cantilever with an integrally formed tip. The remaining silicon is then removed. Alternatively, silicon nitride is formed into a cantilever with an integrally formed sharp tip.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Thin film microcantilevers are particularly well suited for use in atomic force microscopes and other microscope systems. The utility of prior art cantilevers has been diminished by the fact that while the cantilevers can be batch fabricated using integrated circuit processing techniques, there has not been a good way of incorporating a sharp tip on the cantilever. The following is a description of a new batch process which has successfully yielded sharp tips on thin film cantilevers.

Figure 1:
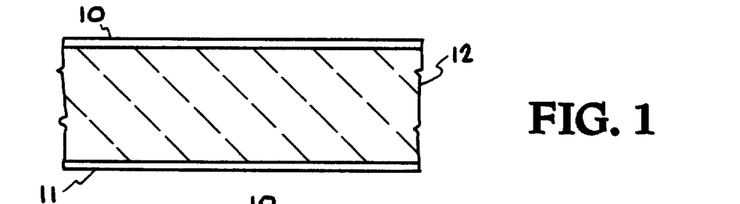
FIG. 1 is a cross-sectional view representing a (100) silicon wafer having a silicon nitride layer on each side.

FIG. 1 shows that the process begins with the deposition of layers $Si_3N_4$ onto both sides of a lightly doped silicon wafer 12 of (100) orientation. A photoresist pattern (not shown) is created on the top side of the wafer. The resist pattern is used as a mask to allow the surrounding $SI_3N_4$ and silicon to be etched in a reactive plasma.

Figure 2:
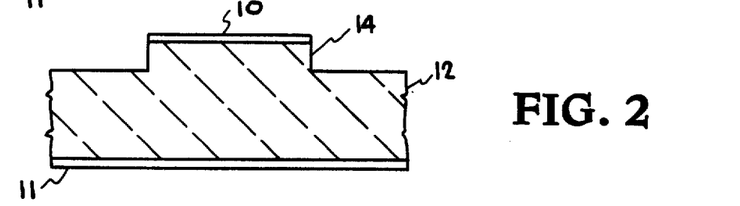
FIG. 2 is a cross-sectional view illustrating a silicon post formed from a (100) silicon layer.
Figure 3:
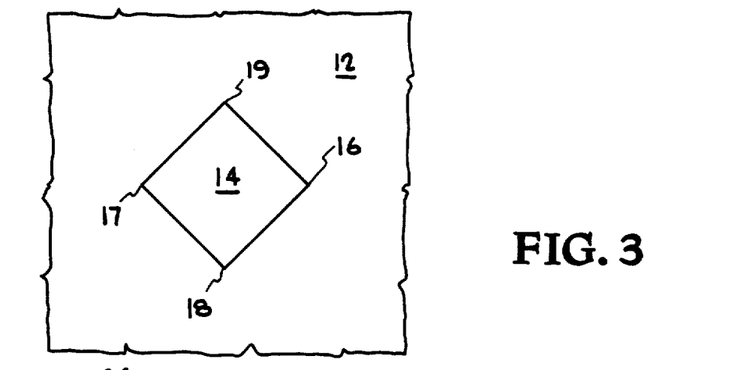
FIG. 3 is a reduced-scale plan view of the post of FIG. 2.

FIGS. 2 and 3 show that what remains after the plasma etch is vertical-walled, silicon post 14 with sharp corners 16, 17, 18, 19 pointing in a <110> direction. Sharp corner 16 defines the location of the desired tip.

Figure 4:
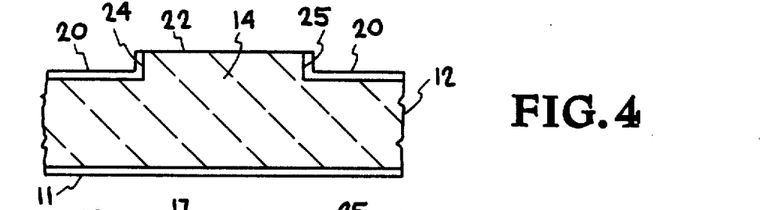
FIGS. 4, 5 and 7 are cross-sectional views illustrating formation of silicon tips.

FIG. 4 illustrates that after the silicon post 14 has been formed the wafer is thermally oxidized so that a thin film of $SiO_2$ 20 covers the entire surface of the wafer except for the top 22 of the post where the presence of $Si_3N_4$ 10 prevents the growth of $SiO_2$. This $Si_3N_4$ is selectively removed in a reactive plasma.

Figure 5:
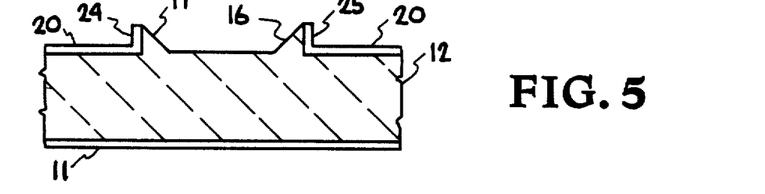

FIG. 5 shows the wafer is then placed in an anisotropic silicon etchant such as KOH solution. Silicon is etched away from the top of the post 14 but is not etched where the $SiO_2$ masks the silicon on the post's sidewalls 24, 25 and the rest of the wafer surface. The etchant preferentially etches all crystal planes other than (111) planes therefore the final profile of the etched out post consists of triangular-shaped features 16, 17 resting against the $SiO_2$ sidewalls at any corners of the post. The length of the KOH etch is timed to produce the desired tip height.

Figure 6:
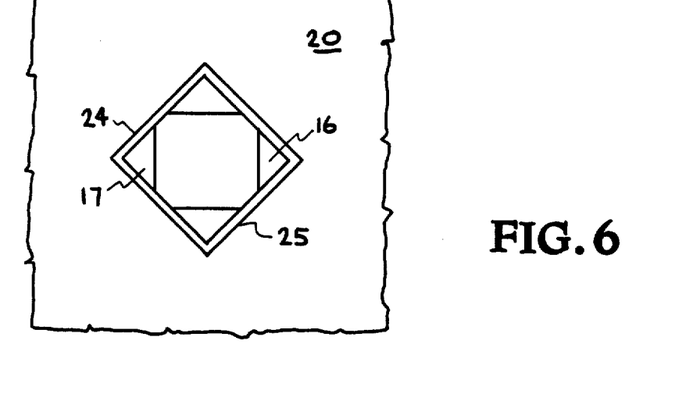
FIG. 6 is a plan view of the tips being formed in FIG. 5.

FIG. 6 shows a plan view of the remains of the etched-away post 14.

Figure 7:
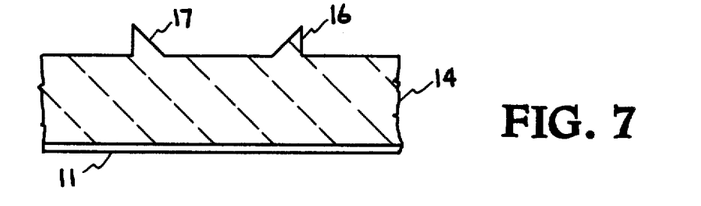

FIG. 7 shows that when the $SiO_2$ is subsequently removed, the sharp silicon tips 16, 17 remain, pointing up perpendicularly from the surface of the wafer. At this step, there are more than one tip due to the fact that tips are formed wherever there are corners on the original post pattern.

Figure 8:
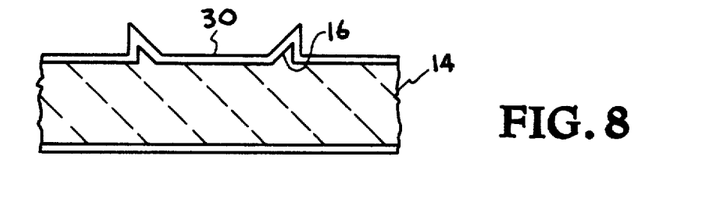
FIGS. 8 and 9 are cross-sectional views of a silicon dioxide cantilever arm being formed with an integrated tip.

FIG. 8 shows that the entire wafer is again thermally oxidized to create the thick oxide layer 30 from which the cantilever is made. The silicon tip 16 oxidizes as well but the oxide tip 32 remains relatively sharp.

Figure 9:
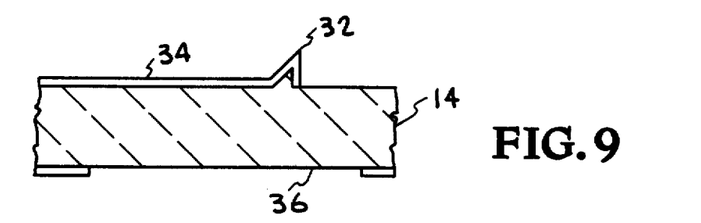
Figure 10:
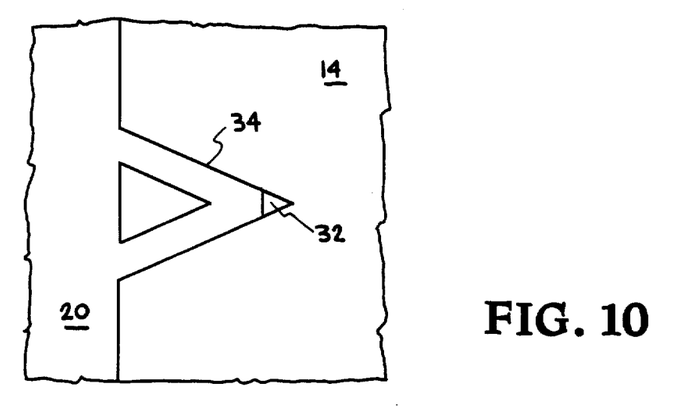
FIG. 10 is a plan view of a V-shaped cantilever arm as formed in FIG. 9.

FIGS. 9 and 10 show that using a very thick photoresist (not shown) to protect the tip 32, a V-shaped cantilever shape 34 is patterned and is used as a mask while the surrounding $SiO_2$ is etched away. The mask is designed so that only the desired tip 32 is incorporated into the cantilever 34 while other tip features are sacrificed during the $SiO_2$ etch. A rectangular pattern 36 is then made on the backside of the wafer directly under the cantilever 34 and the $Si_3N_4$ is removed from this area.

Figure 11:
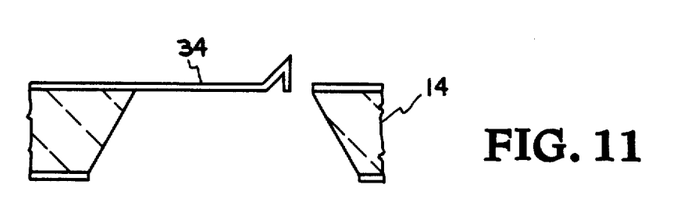
FIG. 11 is a cross sectional view of an integral cantilever arm and tip after being released from the silicon layer.
Figure 12:
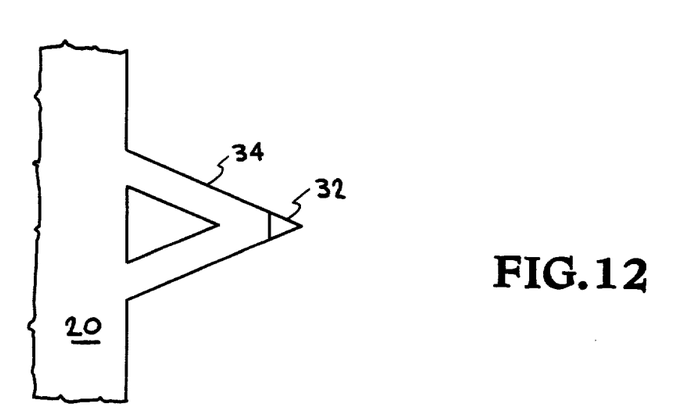
FIG. 12 is a plan view of the V-shaped integral cantilever arm and tip as shown in FIG. 11.

FIGS. 11 and 12 show that finally the wafer is placed in ethylenediamine/pyrocatechol/water (EDP) etchant and the silicon supporting the cantilever 34 is completely etched away leaving a free standing $SiO_2$ cantilever 34. Like KOH, EDP is an anisotropic Si etchant, and by choosing the geometry of the front and backside patterns appropriately, the EDP etch can be made to self-terminate on (111) planes to yield the shape shown. EDP is chosen instead of KOH for this step in order to minimize damage to the $SiO_2$ film.

Since each cantilever structure 34 is quite small (typical size 100×100 microns), hundreds of cantilevers can be constructed simultaneously on a single silicon wafer, taking advantage of the excellent reproducibility and low cost of batch fabrication.

Many of the materials and individual process steps described above can be altered without affecting the utility of the final structure. For example, the size and shape of a cantilever and a tip can be varied over a large range, from microns to millimeters. The cantilever can be made from $Si_3N_4$ instead of $SiO_2$. It is possible to have the tip and the cantilever made of different materials such L as a silicon tip with a $SiO_2$ cantilever. The key step for the successful fabrication of sharp tips on cantilevers is the creation of a post 14 with masked sidewalls and exposed top. Once such a structure is formed, the anisotropic etch produces a sharp tip and the subsequent film depositions or growth are used to form the cantilever.

Figure 13A:
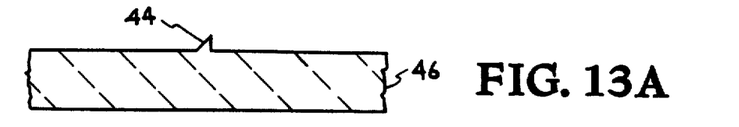
FIGS. 13A-C are cross sectional views of various stages in forming an integral cantilever arm and tip formed from silicon nitride or some other deposited material.
Figure 13B:
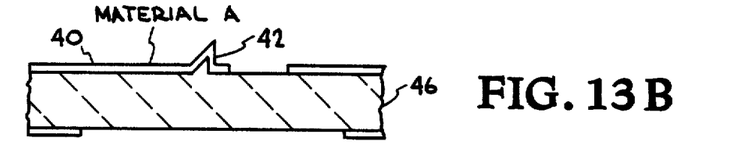
Figure 13C:
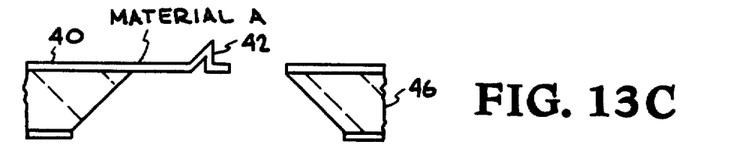
Figure 14A:
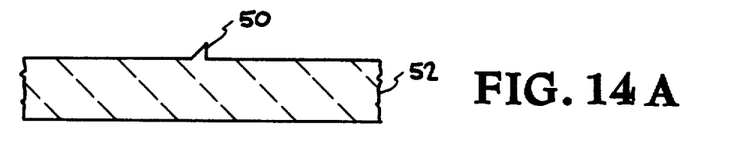
FIGS. 14A-D are cross sectional views of various stages in forming a silicon dioxide cantilever arm and tip formed from a deposited material.
Figure 14B:
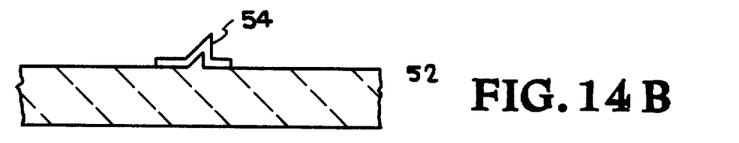
Figures 14C, 14D:
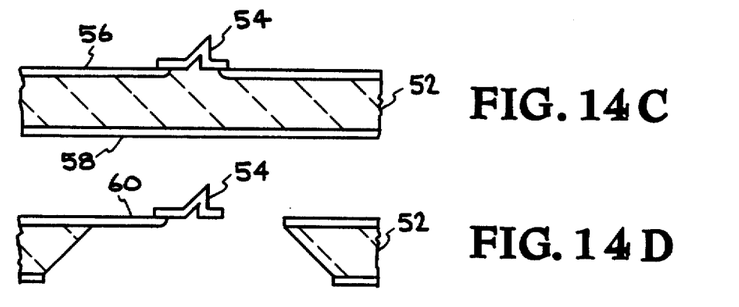

FIGS. 13A–13C illustrate formation of a integral cantilever arm and tip assembly 40 with the tip 42 formed over a sharp point 44 similar to the sharp tip 16 of FIG. 7 on a (100) silicon substrate 40. Material A is formed on both sides of the substrate 46 and patterned to form a cantilever and the backside opening for a KOH etching step. Material A is a material selected from the group, Which includes $Si_3N_4$, deposited $SiO_2$, $Al_2O_3$, CVD diamond film, and various metals, including magnetic materials for a magnetic force microscope application.

FIGS. 14A–14D illustrate formation of a $SiO_2$ cantilever with a $Si_3N_4$ or other deposited material as a tip. A point 50 is formed on a (100) silicon substrate 52 as previously disclosed for FIG. 7. A tip 54 of silicon nitride or some other deposited material is formed by patterning and deposition of over the point 50. The substrate is then thermally oxidized to form oxide layers 56,58. The top layer 56 is patterned and etched to form a cantilever arm 60 with the tip 54 attached to its end after the substrate is etched as shown.

Figure 15A:
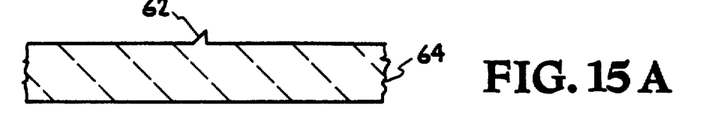
FIGS. 15A-E are cross sectional views of an integral cantilever arm and tip formed of doped silicon.
Figure 15B:
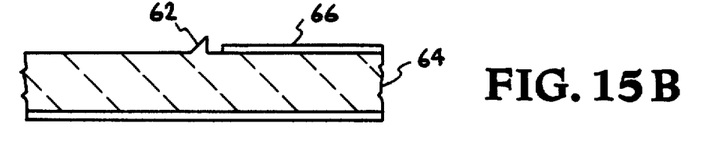
Figure 15C:
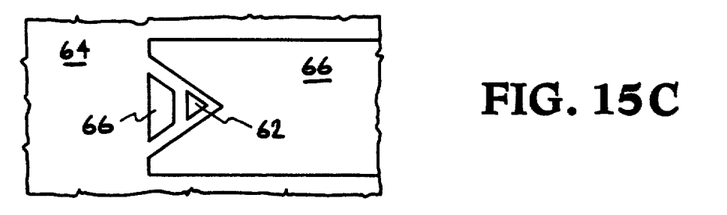
Figure 15D:
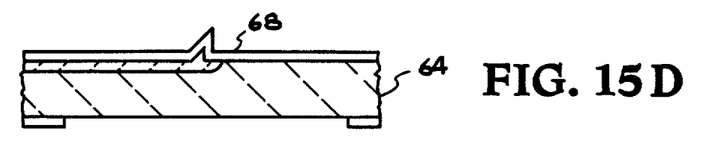
Figure 15E:
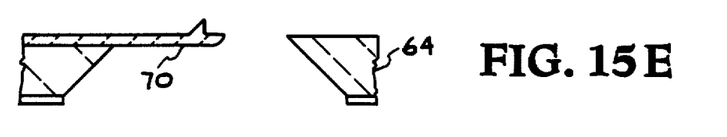

FIGS. 15A–15E illustrate formation of an integrally formed doped silicon cantilever and tip. A point 62 is formed in a (100) silicon substrate 64 as described hereinabove. FIGS. 15B and 15C show a dopant mask 66 formed, for example, of $SiO_2$ or $Si_3N_4$. Boron is used to dope the exposed silicon by ion implantation, diffusion, or other techniques. An etch mask 68 is deposited and patterned using, for example, a masking material such as deposited $SiO_2$, $Si_3N_4$ or Cr/Au. The silicon is then etched anisotropically with KOH or EDP to produce an integral cantilever and tip assembly 70 of doped silicon. The boron doped silicon is not etched by the KOH or EDP.

Figure 16A:
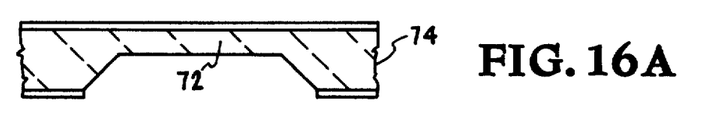
FIGS. 16A-E are cross sectional views of various stages in forming an integral cantilever arm and tip formed of silicon.
Figure 16B:
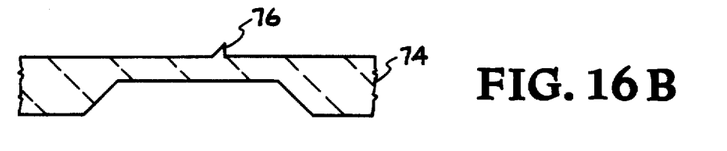
Figure 16C:
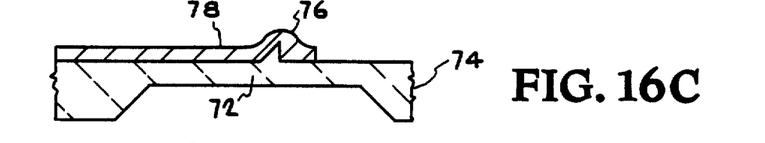
Figure 16D:
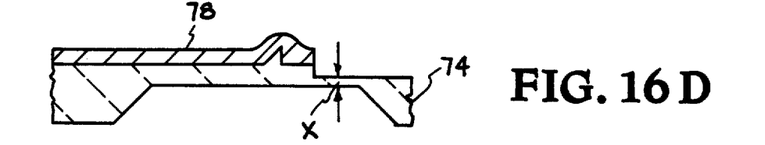
Figure 16E:
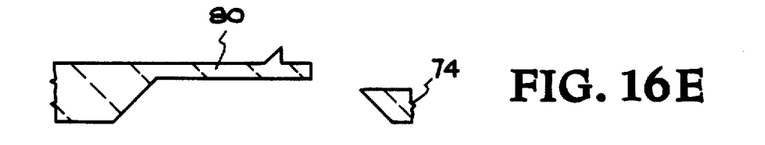

FIGS. 16A–16B illustrate formation of an integral silicon cantilever and tip. A thin silicon membrane 72 is formed by etching a (100) silicon wafer 74 in KOH or EDP with $Si_3N_4$ as a mask shown in FIG. 16A. FIG. 16B shows a point 76 formed as described hereinabove. FIG. 16C shows a thick film 78 of metal, such as aluminum, which forms a cantilever pattern over the point 76 and part of the silicon membrane. As shown by FIG. 16D the topside of the wafer is etched by reactive-ion etching until a cantilever shape having a height equal to a desired cantilever thickness is produced. FIG. 16E shows an integral cantilever and top assembly 80 produced by stripping the metal film 78 and reactive-ion etching until "X" amount of silicon is removed from the bottom side as shown in FIG. 16E.

Figure 17A:
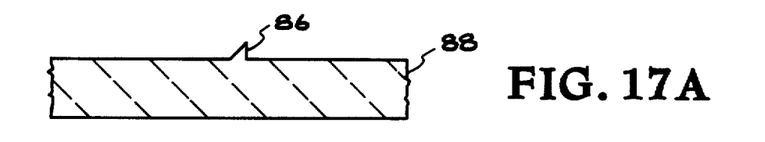
FIGS. 17A-C are cross sectional views of various stages in forming a doped silicon tip and a cantilever of a deposited material.
Figure 17B:
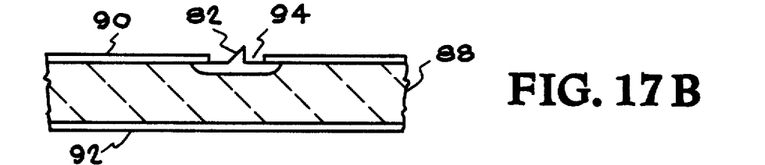
Figure 17C:
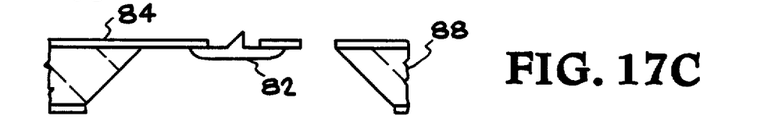

FIGS. 17C–17C illustrate formation of a doped silicon tip 82 attached to a deposited $Si_3N_4$ or $SiO_2$ cantilever 84. Again a point 86 is formed on a (100) silicon substrate 88. FIG. 17B shows layers 90,92 of deposited $Si_3N_4$ or $SiO_2$ on the entire substrate. An opening 94 is formed therein around the point 85 and boron is diffused or implanted into the point. The boron doped tip 82 resists etching. The cantilever 84 is formed by appropriate patterning and removal of $SiO_2$ or $Si_3N_4$. The silicon is then etched in EDP or KOH from the bottom side. Etching is stopped when the silicon is etched through. The boron doping preserves the tip 82 if it is not exposed too long to the EDP or KOH.

Figure 18A:
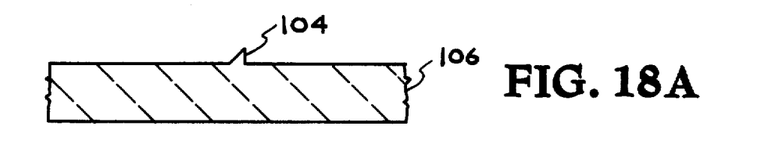
FIGS. 18A-G are cross sectional views of various stages in forming a tip of thermal silicon dioxide and a cantilever of another material.
Figure 18B:
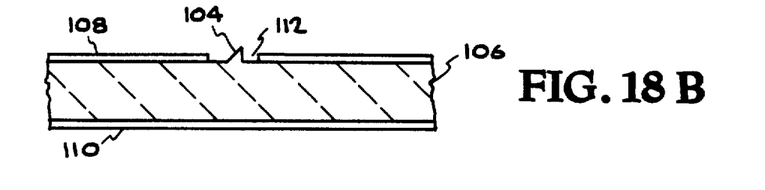
Figure 18C:
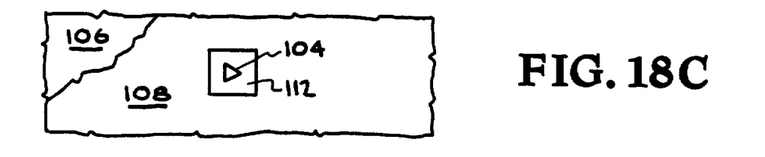
Figure 18D:
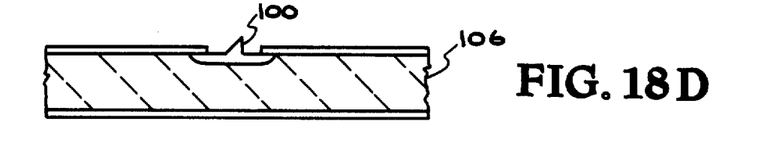
Figure 18E:
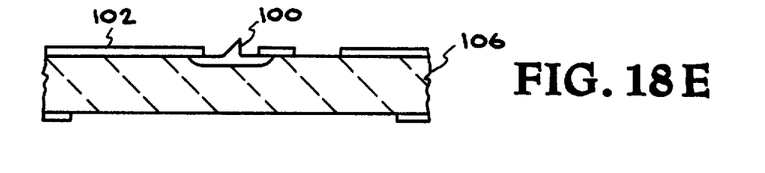
Figure 18F:
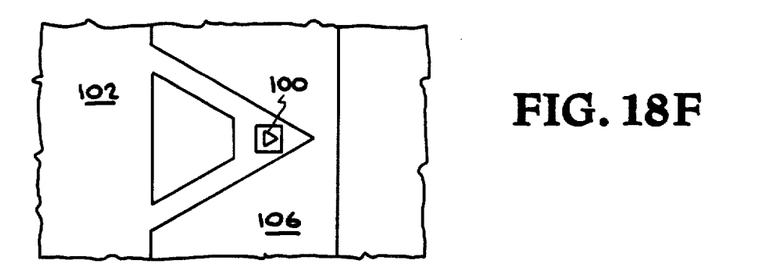
Figure 18G:
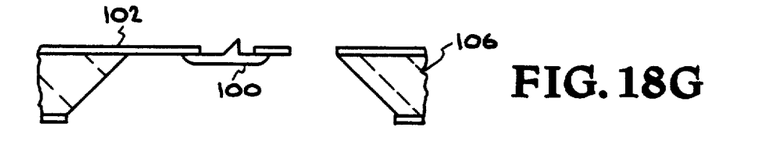

FIGS. 18A–18G illustrate a SiO tip 100 attached to a $Si_3N_4$ cantilever 102. Alternatively, the cantilever can be formed of other materials such as $Al_2O_3$, diamond film, metal, or deposited $SiO_2$. A point 104 is formed as described hereinabove on a (100) silicon substrate 106. FIGS. 18B and 18C show $Si_3N_4$ layers 108,110 deposited on both sides of the substrate 106. An opening 112 is formed around the point 104 which thermally oxidized as shown in FIG. 18D. FIG. 18E and 18F show the cantilever 102 etched out of the $SN_4$ layer 108. FIG. 18G shows the bottom side of the silicon substrate etched away leaving a SiO 100 tip attached to the cantilever 102.

Microcantilevers with sharp tips are of immediate use in the field of scanning probe microscopy and surface profilometry but the general technique of batch fabricating sharp tips of either silicon or $SiO_2$ has use for other tip applications.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A process for producing an integral sharp tip on a thin film cantilever, comprising the steps of:

providing a lightly doped silicon wafer having a (100) orientation;

depositing a $Si_3N_4$ layer on both sides of said silicon wafer;

forming a photoresist pattern over a portion of the $Si_3N_4$ layer on one side of said silicon wafer;

anisotropically etching in a reactive plasma those portions of the $Si_3N_4$ layer and the silicon wafer not covered by said photoresist pattern to form a vertical-walled, silicon post having a rectangular cross-section with sharp corners pointing in a <110> direction;

removing the photoresist from the top of said silicon post to expose the $Si_3N_4$ on the top of the silicon post;

thermally oxidizing the wafer to cover the surface of the silicon wafer with a thin film of $SiO_2$ except on the top of the silicon post having the $Si_3N_4$ thereupon:

selectively removing the $Si_3N_4$ from the top of the silicon post with a reactive plasma;

selectively etching the silicon in the silicon post with an anisotropic silicon etchant while the $SiO_2$ on the sidewalls of the silicon post and the rest of the wafer is not etched, said anisotropic silicon etchant preferentially etching all crystal planes of the silicon post except (111) planes;

continuing to selectively etch the silicon in the silicon post to produce triangular-shaped silicon formations at sharp corners of the silicon post, said triangular-shaped silicon formations having vertical sidewalls adjacent the $SiO_2$ sidewalls, said triangular-shaped silicon formations having a sharp corner pointing in a <110> direction;

continuing to selectively etch the silicon in the remaining portions of the triangular-shaped silicon formations to a predetermined height;

removing the SiO₂ covering the surface of the silicon wafer to expose the vertical sidewalls of said triangular-shaped silicon formations;

thermally oxidizing the wafer to form an SiO₂ layer on the wafer surface and on the triangular-shaped silicon formations;

covering portions of said SiO₂ layer with a photoresist layer to form a pattern having a cantilever shape in said SiO₂ layer;

covering that portion of said SiO₂ layer overlying one of said triangular-shaped silicon formations with said photoresist layer;

etching away those portions of the SiO₂ layer not covered with said photoresist layer to leave a SiO₂ cantilever having a projecting tip portion adjacent said one of said triangular-shaped silicon formations;

etching away the silicon supporting the SiO₂ cantilever having a projecting tip portion to provide a freestanding SiO₂ cantilever with an integrally formed projecting tip portion.

2. The process of claim 1 including the step of simultaneously forming a plurality of cantilevers in a batch on a single silicon wafer.

3. A process for forming an integral sharp tip on a thin film cantilever, comprising the steps of:

forming a silicon post on the surface of a (100) silicon wafer, with said silicon post having vertically extending steep sidewalls and a rectangular cross-section with sharp corners pointing in a <110> direction;

masking the side walls of said silicon post with silicon dioxide;

selectively etching said silicon post with an anisotropic silicon etchant to preferentially etch all crystal planes of the silicon post except the (111) planes to produce triangular-shaped silicon formations at the sharp corners of the silicon post, said triangular-shaped formations having vertical sidewalls and having a sharp corner pointing in a <110> direction;

forming a cantilever arm on the substrate with one of the triangular-shaped silicon formations forming a tip integrally attached to said cantilever arm;

removing portions of the silicon substrate to free said cantilever arm with an integrally formed tip thereof from the substrate.

4. The process of claim 3 wherein the silicon tip is formed of doped silicon.

5. The process of claim 3 wherein the tip is formed of silicon and including the step of forming the cantilever arm by depositing a layer of deposited material on the surface of the substrate and patterning that layer to form a cantilever arm with the silicon tip fixed to the arm.

6. A process for forming an integral sharp tip on a thin film cantilever, comprising the steps of:

forming a silicon post on the surface of a (100) silicon wafer, with said silicon post having vertically extending steep sidewalls and a rectangular cross-section with sharp corners pointing in a <110> direction;

masking the side walls of said silicon post with silicon dioxide;

selectively etching said silicon post with an anisotropic silicon etchant to preferentially etch all crystal planes of the silicon post except the (111) planes to produce triangular-shaped silicon formations at the sharp corners of the silicon post, said triangular-shaped formations having vertical sidewalls and having a sharp corner pointing in a <110> direction;

thermally oxidizing the wafer to form an SiO₂ layer on the wafer surface and on the triangular-shaped silicon formations;

patterning said SiO₂ layer to form a tip of SiO₂ material;

forming a cantilever arm with said SiO₂ tip fixed thereto.

7. The process of claim 6 including the step of forming a cantilever arm from said SiO₂ material, which arm is integrally fixed to the SiO₂ tip.

8. The process of claim 6 including the step of forming a cantilever arm from a deposited material.

9. The process of claim 8 wherein the deposited material is selected from the group consisting of Al₂O₃, diamond film, metal, and deposited SiO₂.

10. A process for forming a sharp thin-film tip, comprising the steps of:

forming a silicon post on the surface of a (100) silicon wafer, with said silicon post having vertically extending steep sidewalls and a rectangular cross-section with sharp corners pointing in a 110 direction;

masking the sides of said silicon post with silicon dioxide;

selectively etching said silicon post with an anisotropic silicon etchant to preferentially etch all crystal planes of the silicon post except the (111) planes to produce triangular-shaped silicon formations at the sharp corners of the silicon post, said triangular-shaped formations having vertical sidewalls and having a sharp corner pointing in a (110) direction;

forming a layer of deposited material over one of said triangular-shaped silicon formations;

removing the one of said triangular-shaped silicon formations to provide a tip of said deposited material.

11. The process of claim 10 including the step of depositing and patterning a cantilever arm from said layer of deposited material wherein said cantilever arm is integral with the tip formed of said deposited material.

12. The process of claim 10 including the step of forming a cantilever arm with the tip integrally fixed thereto by thermally oxidizing and patterning the silicon substrate to from a silicon dioxide cantilever arm with the tip fixed thereto.

13. A microminiature cantilever stylus, comprising:
a thin-film cantilever arm member; and
a projecting tip fixed to said cantilever arm member, said tip formed from a (100) silicon wafer and having a base formed in the (100) plane and fixed to said cantilever arm, said tip having three side surfaces which meet at a point, wherein first and second perpendicular side surfaces extend perpendicularly from the (100) plane of said base, said tip having a third oblique side formed in the (111) plane and extending from said base.

14. The stylus of claim 13 wherein said cantilever arm member and said tip are formed of doped silicon.

15. The stylus of claim 14 wherein said cantilever arm member is formed from a deposited thin-film material.

16. The stylus of claim 14 wherein said tip is formed of thermally oxidized silicon.

17. A microminiature cantilever stylus comprising:
a thin-film cantilever arm member;
a projecting tip fixed to said cantilever arm member, said tip being formed as a layer of thin-film material deposited over and conforming to the exterior surface of a pointed silicon tip mold, said silicon tip mold formed from a (100) silicon wafer and having a base formed in the (100) plane, said tip mold having three side surfaces which extend from the base to meet in a point wherein said pointed silicon tip mold includes first and second perpendicular side surfaces extending perpendicularly from said base and includes a third oblique side formed in the (111) plane and extending from the base.

18. The stylus of claim 17 wherein said cantilever arm member and said tip are formed from the same thin-film material.

19. The stylus of claim 18 wherein said same thin-film material is deposited silicon dioxide.

* * * * *

UNITED STATES PATENT AND TRADEMARK OFFICE
CERTIFICATE OF CORRECTION

PATENT NO. : 4,943,719
DATED : July 24, 1990
INVENTOR(S) : Akamine et al.

It is certified that error appears in the above-indentified patent and that said Letters Patent is hereby corrected as shown below:

Column 1, after title insert --This invention was made with Government support under contract N00014-84-K-0327 awarded by the Department of the Navy. The Government has certain rights in this invention.

Signed and Sealed this

Sixteenth Day of May, 1995

Attest:

BRUCE LEHMAN

Attesting Officer

Commissioner of Patents and Trademarks